(12) United States Patent
Fischmann T.

(10) Patent No.: US 9,120,689 B2
(45) Date of Patent: *Sep. 1, 2015

(54) SYSTEM FOR PROVIDING HIGH MICROBIOLOGICAL QUALITY COOLING WATER TO AN INDUSTRIAL PROCESSES

(71) Applicant: CRYSTAL LAGOONS (CURACAO) B.V., Curacao (NL)

(72) Inventor: Fernando Fischmann T., Santiago (CL)

(73) Assignee: Crystal Lagoons (Curacao) B.V., Curacao (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,262

(22) Filed: Apr. 11, 2013

(65) Prior Publication Data

US 2013/0264261 A1 Oct. 10, 2013

Related U.S. Application Data

(62) Division of application No. 13/195,695, filed on Aug. 1, 2011, now Pat. No. 8,454,838.

(60) Provisional application No. 61/469,526, filed on Mar. 30, 2011.

(51) Int. Cl.
B01D 35/14 (2006.01)
B01D 17/12 (2006.01)
(Continued)

(52) U.S. Cl.
CPC .............. *C02F 1/5281* (2013.01); *C02F 9/00* (2013.01); *B01D 35/14* (2013.01); *B01D 36/04* (2013.01);
(Continued)

(58) Field of Classification Search
CPC ........ B01D 17/12; B01D 36/00; B01D 36/02; B01D 36/04; B01D 2201/01; B01D 2307/14; B01D 2221/08; B01D 2221/01; C02F 1/008; C02F 1/44; C02F 1/52; C02F 1/72; C02F 1/78; C02F 5/08; C02F 1/5281; C02F 9/00; C02F 2103/023; C02F 2209/02; C02F 2209/04; C02F 2209/11; C02F 2201/007; C02F 2201/008; C02F 2303/04; C02F 1/40; C02F 1/56; C02F 2103/42; C02F 2103/007; F25D 1/00; F25D 1/02; F25D 2600/00; F25D 2600/04; F24J 2/40; F24J 3/06
USPC ........ 210/742, 746, 764, 96.1, 143, 175, 182, 210/184, 167.01, 170.01, 194, 195.1, 198.1, 210/201–203, 241, 259, 805, 806, 170.1, 210/170.09, 747.1, 747.5, 747.9; 422/14; 261/2, 3, 6, DIG. 79; 165/47, 108, 900, 165/45, 200, 279; 220/23.9, 495.01, 565, 220/567; 62/259.1, 260
See application file for complete search history.

(56) References Cited

U.S. PATENT DOCUMENTS 2,071,520 A 2/1937 Harrison
2,141,811 A 12/1938 Everson
(Continued)

FOREIGN PATENT DOCUMENTS

CN 1256250 6/2000
CN 102092824 6/2011
(Continued)

OTHER PUBLICATIONS

Eurasian Office Action for corresponding application No. 201001477/31 and response to Office Action dated Apr. 2, 2013 with English Translation.
(Continued)

*Primary Examiner* — Joseph Drodge
(74) *Attorney, Agent, or Firm* — Merchant & Gould P.C.

(57) ABSTRACT

A method and system for treating water, and using the treated water for the cooling of industrial processes is disclosed. The water is treated and stored in a large container or artificial lagoon, has high clarity and high microbiological quality. A system of the invention generally includes a containing means, such as a large container or artificial lagoon, a coordination means, a chemical application means, a mobile suction means, and a filtration means. The coordination means monitors and controls the processes in order to adjust water quality parameters within specified limits. The large container or artificial lagoon can act as a heat sink, absorbing waste heat from the industrial cooling process, thus creating thermal energy reservoirs in a sustainable manner, which can be later used for other purposes. The method and system can be used in any industrial cooling system with any type of water available, including fresh water, brackish water, and seawater.

25 Claims, 3 Drawing Sheets

(51) Int. Cl.

| | | |
|---|---|---|
| *B01D 36/04* | (2006.01) | |
| *C02F 1/44* | (2006.01) | |
| *C02F 1/56* | (2006.01) | |
| *C02F 1/72* | (2006.01) | |
| *C02F 1/78* | (2006.01) | |
| *C02F 9/00* | (2006.01) | |
| *C02F 1/52* | (2006.01) | |
| *C02F 1/00* | (2006.01) | |
| *C02F 5/08* | (2006.01) | |
| *C02F 103/02* | (2006.01) | |
| *C02F 103/42* | (2006.01) | |

(52) U.S. Cl.
CPC . *C02F 1/008* (2013.01); *C02F 1/44* (2013.01); *C02F 1/56* (2013.01); *C02F 1/72* (2013.01); *C02F 1/78* (2013.01); *C02F 5/08* (2013.01); *C02F 2103/023* (2013.01); *C02F 2103/42* (2013.01); *C02F 2209/02* (2013.01); *C02F 2209/04* (2013.01); *C02F 2209/11* (2013.01); *Y02W 10/37* (2015.05)

(56) References Cited

U.S. PATENT DOCUMENTS

| | | | |
|---|---|---|---|
| 2,314,767 A | 3/1943 | Burrell | |
| 2,646,889 A | 7/1953 | August | |
| 2,923,954 A | 2/1960 | Babcock | |
| 3,132,773 A | 5/1964 | Hampton | |
| 3,247,053 A * | 4/1966 | Hodge | 504/158 |
| 3,266,631 A | 8/1966 | Snaper | |
| 3,317,925 A | 5/1967 | Vance | |
| 3,361,150 A * | 1/1968 | Horner | 204/404 |
| 3,406,416 A | 10/1968 | Presby et al. | |
| 3,412,862 A | 11/1968 | Chaplin | |
| 3,419,916 A | 1/1969 | Schankler | |
| 3,470,091 A | 9/1969 | Budd et al. | |
| 3,540,274 A | 11/1970 | Shore | |
| 3,641,594 A | 2/1972 | Hough | |
| 3,660,957 A | 5/1972 | Schankler | |
| 3,695,434 A | 10/1972 | Whitten, Jr. | |
| 3,748,810 A | 7/1973 | Mattingly | |
| 3,788,982 A | 1/1974 | Zsoldos, Jr. et al. | |
| 3,844,760 A | 10/1974 | Nelson | |
| 3,887,666 A * | 6/1975 | Heller et al. | 261/130 |
| 3,949,442 A | 4/1976 | Chandler | |
| 3,950,809 A | 4/1976 | Schatzmann | |
| 4,055,491 A | 10/1977 | Porath-Furedi | |
| 4,060,575 A * | 11/1977 | Uhlirsch et al. | 261/111 |
| 4,063,419 A * | 12/1977 | Garrett | 60/641.8 |
| 4,090,266 A | 5/1978 | Price | |
| 4,100,641 A | 7/1978 | Pansini | |
| 4,117,683 A * | 10/1978 | Rasmussen | 405/61 |
| 4,119,535 A | 10/1978 | White | |
| 4,129,904 A | 12/1978 | Pansini | |
| 4,176,058 A | 11/1979 | Grobler | |
| 4,254,525 A | 3/1981 | Combest | |
| 4,254,818 A * | 3/1981 | Melamed | 165/45 |
| 4,263,759 A | 4/1981 | Miller | |
| 4,304,022 A | 12/1981 | Sommer | |
| 4,306,967 A * | 12/1981 | Trautwein | 210/167.31 |
| 4,338,697 A | 7/1982 | Broadwater | |
| 4,343,696 A | 8/1982 | Hung | |
| 4,402,101 A | 9/1983 | van Zyl | |
| 4,464,215 A * | 8/1984 | Cogliano | 156/71 |
| 4,519,914 A | 5/1985 | Etani | |
| 4,548,371 A | 10/1985 | Dempsey | |
| 4,572,767 A | 2/1986 | McCord | |
| 4,581,075 A | 4/1986 | St. Martin | |
| 4,640,784 A | 2/1987 | Cant | |
| 4,652,378 A | 3/1987 | Marikovsky et al. | |
| 4,692,956 A | 9/1987 | Kassis | |
| 4,752,740 A | 6/1988 | Steininger | |
| 4,767,511 A | 8/1988 | Aragon | |
| 4,768,532 A | 9/1988 | Johnson | |
| 4,776,053 A | 10/1988 | Kiraly | |
| 4,835,810 A | 6/1989 | Hugo | |
| 4,849,024 A | 7/1989 | Supra | |
| 4,880,547 A | 11/1989 | Etani | |
| 4,889,622 A | 12/1989 | Newcombe-Bond | |
| 4,909,266 A | 3/1990 | Massa | |
| 4,931,187 A * | 6/1990 | Derham et al. | 210/662 |
| 4,948,296 A | 8/1990 | Salter | |
| 4,952,398 A | 8/1990 | Tapin | |
| 5,028,321 A | 7/1991 | Stone et al. | |
| 5,039,427 A | 8/1991 | Conover | |
| 5,106,229 A | 4/1992 | Blackwell | |
| 5,107,872 A | 4/1992 | Meincke | |
| 5,108,514 A | 4/1992 | Kisner | |
| 5,143,623 A | 9/1992 | Kroll | |
| 5,164,094 A | 11/1992 | Stuckart | |
| 5,172,445 A | 12/1992 | Chandler | |
| 5,245,723 A | 9/1993 | Sommer | |
| 5,268,092 A * | 12/1993 | Eden | 210/96.1 |
| 5,293,659 A | 3/1994 | Rief et al. | |
| 5,337,434 A | 8/1994 | Erlich | |
| 5,342,570 A * | 8/1994 | Ledoux et al. | 264/566 |
| 5,346,566 A | 9/1994 | White | |
| 5,398,361 A | 3/1995 | Cason | |
| 5,422,014 A * | 6/1995 | Allen et al. | 210/743 |
| 5,454,129 A | 10/1995 | Kell | |
| 5,569,371 A * | 10/1996 | Perling | 210/85 |
| 5,616,239 A | 4/1997 | Wendell et al. | |
| 5,662,940 A | 9/1997 | Hight et al. | |
| 5,782,480 A | 7/1998 | Phillips | |
| 5,802,631 A | 9/1998 | Friedman | |
| 5,842,243 A | 12/1998 | Horvath et al. | |
| 5,985,156 A * | 11/1999 | Henkin et al. | 210/744 |
| 6,017,400 A | 1/2000 | Clark et al. | |
| 6,149,819 A | 11/2000 | Martin et al. | |
| 6,224,826 B1 | 5/2001 | Katakura et al. | |
| 6,228,272 B1 | 5/2001 | Gola | |
| 6,231,268 B1 | 5/2001 | Hausenbauer | |
| 6,280,639 B1 | 8/2001 | Ortiz | |
| 6,284,144 B1 | 9/2001 | Itzhak | |
| 6,303,038 B1 | 10/2001 | Sanders et al. | |
| 6,317,901 B1 | 11/2001 | Corpuel | |
| 6,409,926 B1 | 6/2002 | Martin | |
| 6,419,840 B1 | 7/2002 | Meincke | |
| 6,444,176 B1 | 9/2002 | Yoshinaga et al. | |
| 6,539,573 B1 | 4/2003 | Caccavella | |
| 6,620,315 B2 * | 9/2003 | Martin | 210/96.1 |
| 6,896,799 B2 | 5/2005 | Ohanian | |
| 7,163,619 B2 * | 1/2007 | Wang | 210/153 |
| 7,189,314 B1 | 3/2007 | Pace et al. | |
| 7,252,843 B2 | 8/2007 | Moore et al. | |
| 7,820,055 B2 | 10/2010 | Fischmann Torres | |
| 7,832,959 B1 | 11/2010 | Groen et al. | |
| 7,862,712 B2 | 1/2011 | Tak | |
| 8,153,010 B2 * | 4/2012 | Duarte et al. | 210/696 |
| 8,388,837 B2 | 3/2013 | Tormaschy et al. | |
| 8,524,088 B2 * | 9/2013 | Arbogast et al. | 210/696 |
| 2002/0117430 A1 | 8/2002 | Navarro et al. | |
| 2003/0046933 A1 * | 3/2003 | Moss et al. | 60/657 |
| 2003/0091467 A1 | 5/2003 | Kmec et al. | |
| 2003/0094421 A1 | 5/2003 | Gargas | |
| 2003/0228195 A1 | 12/2003 | Mizutani | |
| 2004/0025269 A1 | 2/2004 | Pichon | |
| 2004/0129644 A1 | 7/2004 | Unhoch | |
| 2004/0211450 A1 | 10/2004 | Stoltz | |
| 2004/0217326 A1 | 11/2004 | Souter et al. | |
| 2004/0226896 A1 | 11/2004 | Lovestead et al. | |
| 2005/0009192 A1 | 1/2005 | Page | |
| 2005/0016906 A1 * | 1/2005 | Gettman | 210/143 |
| 2005/0063782 A1 * | 3/2005 | Stoecker et al. | 405/50 |
| 2005/0145552 A1 | 7/2005 | Sheets | |
| 2005/0194322 A1 | 9/2005 | Palmer | |
| 2005/0207939 A1 | 9/2005 | Roussi et al. | |
| 2006/0054568 A1 | 3/2006 | Jones et al. | |
| 2006/0169322 A1 | 8/2006 | Torkelson | |
| 2006/0174430 A1 | 8/2006 | Pareti | |
| 2007/0059562 A1 | 3/2007 | Hattori et al. | |
| 2007/0181498 A1 | 8/2007 | Kaas | |

(56) References Cited

U.S. PATENT DOCUMENTS

| | | |
|---|---|---|
| 2007/0181510 A1 | 8/2007 | Harvey et al. |
| 2008/0116142 A1 | 5/2008 | Fischmann Torres |
| 2008/0295615 A1 | 12/2008 | Sihalla |
| 2009/0050572 A1 | 2/2009 | McGuire et al. |
| 2009/0087549 A1 | 4/2009 | Zhou et al. |
| 2010/0320147 A1 | 12/2010 | McGuire et al. |
| 2011/0009019 A1 | 1/2011 | Neira et al. |
| 2011/0061194 A1 | 3/2011 | Fischmann Torres |
| 2011/0062067 A1 | 3/2011 | Fischmann Torres |
| 2011/0132815 A1 | 6/2011 | Angellili et al. |
| 2011/0210076 A1 | 9/2011 | Fischmann Torres |

FOREIGN PATENT DOCUMENTS

| | | |
|---|---|---|
| DE | 2 141 460 | 2/1973 |
| DE | 38 44 374 | 7/1990 |
| DE | 19515428 | 11/1996 |
| DE | 297 16 994 | 1/1998 |
| DE | 198 14 705 | 10/1998 |
| DE | 198 60 568 | 12/1998 |
| DE | 10 2010 019 510 | 11/2011 |
| EP | 0 352 487 | 1/1990 |
| EP | 0 468 876 | 1/1992 |
| EP | 0 483 470 | 5/1992 |
| EP | 1 420 130 | 5/2004 |
| EP | 168 85 62 | 8/2006 |
| ES | 200 14 29 | 5/1998 |
| FR | 2 544 005 | 10/1984 |
| FR | 2 668 527 | 4/1992 |
| FR | 2 685 374 | 6/1993 |
| FR | 2 740 493 | 4/1997 |
| FR | 2 785 898 | 5/2000 |
| GB | 1494005 | 12/1977 |
| GB | 2045606 | 11/1980 |
| GB | 2 243 151 | 10/1991 |
| JP | 59-012287 | 1/1984 |
| JP | 59-222294 | 12/1984 |
| JP | 4-115008 | 4/1992 |
| JP | 5-220466 | 8/1993 |
| JP | 04073612 | 8/1993 |
| JP | 5-261395 | 10/1993 |
| JP | 7-310311 | 11/1995 |
| JP | 3026643 | 1/1996 |
| JP | 10-169226 | 6/1998 |
| JP | 2001-3586 | 1/2001 |
| JP | 2001-9452 | 1/2001 |
| JP | 2002-90339 | 3/2002 |
| JP | 2002-282860 | 10/2002 |
| JP | 2003-190989 | 7/2003 |
| JP | 2003-200173 | 7/2003 |
| JP | 2004-958 | 1/2004 |
| JP | 2005-288392 | 10/2005 |
| JP | 2006-68624 | 3/2006 |
| JP | 2007-500073 | 1/2007 |
| JP | 2011-5463 | 1/2011 |
| KR | 20-0162956 | 9/1999 |
| TW | 432013 | 8/1987 |
| TW | 482186 | 12/1990 |
| UY | 30184 | 5/2007 |
| WO | WO 8101585 | 6/1981 |
| WO | WO 9848132 | 10/1998 |
| WO | WO 03/010388 | 2/2003 |
| WO | WO 2006/069418 | 7/2006 |
| WO | WO 2007/029277 | 3/2007 |
| WO | WO 2007/059562 | 5/2007 |
| WO | WO 2009/114206 | 9/2009 |
| WO | WO 2010/074770 | 7/2010 |

OTHER PUBLICATIONS

Communication from EPO for corresponding application No. 09835402.0 dated Jan. 30, 2013.
Response filed for EP 09835402.0 dated Jul. 23, 2013. (11 pages).
Response filed for EP 09835402.0 dated Aug. 14, 2013. (9 pages).
African Regional Intellectual Property Organization (ARIPO) report for corresponding application No. AP/P/2007/004242 dated Dec. 7, 2010.
Ballentine, "Ambient Water Quality Criteria for Bacteria—1986", Jan. 1986, United States EPA, EPA440/5-84-002, p. 16.
Chilean Examiner's report from Application No. 3900-08 issued Aug. 31, 2009.
Final Office Action mailed Apr. 3, 2012 from U.S. Appl. No. 13/136,458.
Final Office Action mailed Nov. 28, 2011 from U.S. Appl. No. 13/076,151.
Non-Final Office Action mailed Apr. 24, 2012 from U.S. Appl. No. 13/136,474.
Non-Final Office Action mailed Jul. 19, 2011 from U.S. Appl. No. 13/076,151.
Office Action for corresponding U.S. Appl. No. 12/884,842 mailed Mar. 1, 2011.
Office Action for corresponding U.S. Appl. No. 12/884,872 mailed Mar. 1, 2011.
Restriction Requirement Office Action mailed Jan. 13, 2012 from U.S. Appl. No. 13/136,474.
Restriction Requirement Office Action mailed Jan. 13, 2012 from U.S. Appl. No. 13/136,458.
European Search Report from European Application No. 07 07 5995 mailed Mar. 9, 2010.
International Search Report and Written Opinion for International Application No. PCT/US2011/051129 mailed Feb. 8, 2012.
International Search Report and Written Opinion for International Application No. PCT/US2011/051236 mailed Jan. 26, 2012.
International Search Report and Written Opinion for International Application No. PCT/US2011/051244 mailed Jan. 25, 2012.
International Search Report mailed May 6, 2009, in co-pending related PCT Application No. PCT/US2009/036809.
Japanese Office Action for corresponding application No. 2007-299975 dated May 31, 2011—translation provided.
Norwegian Search Report from Norwegian Application No. 20075880 dated Feb. 4, 2010.
Pakistan Examination Report, 2010.
Panama Search Report from Panama Application No. 87176-01 dated Mar. 17, 2010.
Panama Search Report from Panama Application No. 88509-01 dated Oct. 7, 2010.
Peruvian Technical Report for corresponding application No. 000244-2007 dated Sep. 2, 2010—translation provided.
Second Singapore Office Action for corresponding application No. 200717963-3 dated Dec. 23, 2010.
Singapore Office Action for corresponding application No. 200717963-3 dated Dec. 23, 2010.
World Health Organization: Guidelines for safe recreational waters. vol. 2. Swimming pools and similar recreational water environments. Switzerland. Jun. 27, 2006 ISBN 92-4-154680-8 Chapter 4.
World Health Organization: Guidelines for safe recreational waters. vol. 2. Swimming pools and similar recreational water environments. Switzerland. Jun. 27, 2006 ISBN 92-4-154680-8 Chapter 5.

\* cited by examiner

US 9,120,689 B2

SYSTEM FOR PROVIDING HIGH MICROBIOLOGICAL QUALITY COOLING WATER TO AN INDUSTRIAL PROCESSES

This application is a Divisional application of U.S. patent application Ser. No. 13/195,695, filed 1 Aug. 2011, which claims benefit of U.S. Provisional Ser. No. 61/469,526, filed 30 Mar. 2011 and which applications are incorporated herein by reference. To the extent appropriate, a claim of priority is made to each of the above disclosed applications.

FIELD OF THE INVENTION

The present invention relates to a method and system for treating water, and using the treated water for the cooling of industrial processes. The water is treated and stored in a large container or artificial lagoon, has high clarity and high microbiological quality. The large container or artificial lagoon can act as a heat sink, absorbing waste heat from the industrial cooling process, thus creating thermal energy reservoirs in a sustainable manner, which can be later used for other purposes. The method and system can be used in any industrial cooling system with any type of water available, including fresh water, brackish water, and seawater.

BACKGROUND

Industries worldwide have increased significantly in number and have improved their processes over the years. Many of these industries require systems that provide cooling for at least some of their processes. Many of the cooling systems utilize water as a heat sink or heat transfer fluid. However, water is a limited resource. Exploitation and contamination of underground aquifers, oceans, and surface waters has occurred, leading to a decrease in the quantity of suitable water, as well as the quality of the naturally available water. Thus, new ways of using water in a sustainable and economical way need to be found in order to utilize this resource in an efficient manner and without damaging the environment.

Current industrial cooling systems are often restricted to areas where large volumes of cooling water are available. For example, cooling systems are often located along an ocean coast line or near other natural sources of water, such as rivers and large lakes, where this resource exists abundantly. Accordingly, a significant drawback associated with water-based cooling systems is that they are often constrained to specific geographical areas. For example, for a 350 MW power plant using coal, nearly 45,000 cubic meters of water per hour may be needed for cooling purposes, such as in plant heat exchangers, equivalent to filling 18 Olympic swimming pools in just one hour.

Moreover, waste heat absorbed by the cooling water generally is lost into the environment by discharging the heated water back into a natural source of water, or by discharging water vapor into the atmosphere. Recoverable energy that is wasted throughout the world each day may be up to 80% of the total electricity consumed daily worldwide.

Specific representative environments which may benefit from improved industrial water-based cooling systems can include, but are not limited to, the following:

Thermal Power Plants

Increases in population and technological advances have resulted in a vast demand for additional energy. A significant use of worldwide energy is concentrated in the generation of electricity. The demand for electricity is growing at a pace set by the modernization of nations and their economic development. For example, electricity generation has increased nearly 40% in the last 10 years (see FIG. 1). This demand has led to an increase in the construction of new facilities for electricity generation worldwide.

Thermal power plants are currently the predominant type of power plants in operation. These plants employ a fuel to generate combustion, with the combustion heating a fluid which in turn drives a turbine in an electrical generation circuit. There are also a number of power plants using renewable resources—such as solar energy or geothermal energy—generating a driving fluid that in turn drives a turbine. Still other thermal power plants use nuclear fuels, such as uranium. However, available statistics show that of the total energy consumed in 2008, 80% to 90% was derived from the combustion of fossil fuels in thermal power plants. Most typically, these types of plants use coal, oil, or natural gas. In part, this large percentage of electricity production is due to the high availability of fossil fuels in the world. In 1973, the world energy matrix consisted of 78.4% thermal power plants (including nuclear plants), while in 2008 the percentage had increased to 81.5%. There is a continual need for these plants to improve their operational efficiency and reduce their environmental impact.

Over time, thermal power plants have undergone diverse changes associated with their operation. For example, changes have been implemented relating to emissions and the efficient use of fuel. However, a remaining drawback of these plants is the use of water cooling systems. These systems have several disadvantages which restrict the use to certain geographical locations. Additionally, the use of the water and attendant heating of the water produce a potentially damaging impact to the environment, raise energy costs, result in an intensive use of water, waste the residual heat, and/or have high installation and operation costs. Accordingly, improved cooling systems are needed to keep up with the growing demand for energy and electricity.

The current cooling systems used in thermal power plants and other industries are: once through cooling systems, wet cooling towers, and cooling ponds.

Once Through Cooling Systems

One of the main types of cooling systems used today is the "once through" cooling system, which refers to an open-cycle system (i.e., not employing water recirculation). This type of system consists of a water intake structure to collect the water from a natural source and a discharge structure to return the water back to the natural source (e.g., often the ocean or sea). Collected cooling water is circulated through heat exchangers functioning as part of the industrial process. In heat exchangers, the water acts as a heat sink whereby the water temperature increases as it flows through the exchanger. The heated water is then discharged back into the natural source. In the U.S. alone, approximately 5,500 power plants use a once through cooling system. These plants use more than 180,000 million gallons of water per day for cooling purposes. This amount is, for example, more than 13 times the irrigation water used in Australia daily. Once through cooling systems have many drawbacks including environmental damage due to suction and death of marine organisms; thermal pollution from the returned, heated water; restricted location of the plants to a coastline (or on the border of large water sources); poor quality water; and waste of residual heat.

The once through cooling system uses large volumes of water at relatively low cost, but often leads to large-scale adverse effects on the marine ecosystem. For example, this system creates a temperature increase in the discharged water. In the ocean, the sharp increase in temperature can cause serious problems, even resulting in death of living organisms. This affects the marine ecosystem and human activity that takes place on the coast, such as fisheries and other economic activity. The once through cooling system can also cause the death of marine organisms due to suction produced in the water inlet. This may affect millions of fish, larvae and other aquatic organisms each year worldwide because they are sucked into the conduits leading to the heat exchangers. Death can occur because of the filters or screens (e.g., collisions with filters/screens or retention by the filters or screens), because of the driving pumps (e.g., by passing inside structures at high pressures and/or flows that cause collisions with the walls), due to chemicals that may be added, and in the heat exchangers due to the abrupt change of temperature. The laws of some countries and states ban the use of once through cooling systems. Therefore, there is a need to seek new ways of cooling that are sustainable over time and allow better performance and efficiency.

Another major limitation of the once through cooling system is its restricted location. As noted above, these types of plants must typically be located on the coast bordering the sea or inland along rivers, in order to better capture large amounts of water. These locations can create significant land use problems. These industries are thereby limited due to the large volumes of water to be captured and the effect of thermal pollution in such places. Because of this, plants have various problems related to location which results in higher costs and potential rejection by the residents of the community.

Another problem with the once through cooling system is the poor quality of water used for cooling. Once through cooling systems typically use seawater, which has a large organic content. This adversely affects the heat transfer systems of cooling processes. For example, reduced heat transfer occurs due to living or dead organisms which adhere to or clog the pipes. Biofouling is produced and begins to adhere to the inner surface of the pipes, reducing heat transfer and thus generating greater inefficiencies. In addition, new environmental standards recommend (and some require) that plants operate at a high efficiency to maximize the amount of energy produced per unit of fuel. One study estimates that fouling in heat exchangers produces monetary losses in industrialized countries at a level of about 0.25% of Gross Domestic Product (GDP).

Another constraint of once through cooling systems is that all the heat absorbed is discharged back into the natural water source without using the thermal energy in the water. In some instances, the thermal energy that is wasted can approach two thirds of the total generated heat, while the amount of electric energy produced by a power plant is only one third of the total generated heat. It would be advantageous to use this wasted, valuable energy for other beneficial purposes.

Wet Cooling Towers

Another cooling system currently used is a wet cooling tower. These systems cool water through heat exchange with air inside evaporation chimneys. The chimneys contain a cold water reservoir at the base which feeds the plant by pumps that circulate through the condenser of the plant (chillers), thereby transferring the heat of the working fluid of the plant into the water. When the high temperature effluent water reaches the top of the tower, it begins to descend in fine jets to maximize contact area for heat transfer. Some plants have fans, either on the top or bottom of the tower, to circulate air upwards so as to achieve a counter-flow contact with water. As the water falls, it cools and heat loss occurs through evaporation. When water evaporates, dissolved salts fall back into the water tank, thereby increasing its concentration. Therefore, a certain amount of water must be purged from time-to-time and the reservoir must be fed with fresh water. Wet cooling towers have various problems associated with their operation, including high withdrawal rates and evaporation of water, high costs, deterioration of the urban aesthetic or landscape, and loss of the captured residual heat.

A significant problem of wet cooling towers is the high rate of water use. According to the Electric Power Research Institute (EPRI), for a steam driven power station operating on coal, water withdrawal rates are about 2,082 liters/MWh, and water consumption due to evaporation is about 1,817 liters/MWh. Moreover, wet cooling towers require frequent replenishment due to heavy water consumption caused by high evaporation rates. All the evaporated water must be replaced and also from time to time a certain amount of water must be purged due to the increase in mineral concentration in the tank, which also must be replenished. Generally, wet cooling towers work with fresh water, resulting in higher operating costs.

Another major problem of wet cooling towers is that they have high installation, operation, and maintenance costs. For example, for a plant of 2,245 MW, the capital cost may rise to 600 million dollars.

Further, wet cooling towers cause a deterioration of urban aesthetics and landscape. This is due to both the structure of the tower and the steam discharged from the tower into the atmosphere. The steam interferes with the landscape view and can cause wet pavements, roads, and other adjacent surfaces. A further limitation of wet cooling towers is that they do not exploit the residual energy, since they discharge virtually all the residual heat into the atmosphere as water vapor. Accordingly, the overall energy efficiency of the process is reduced.

Cooling Ponds

Many current cooling systems used in industrial processes employ cooling ponds. Cooling ponds generally consist of large volumes of water contained in a pond from which cooling water is extracted. After going through a heat exchange process in the plant, the water (with a higher temperature) is discharged back into the pond. The area of the pond typically depends on the capacity and efficiency of the plant. These types of ponds are used by almost fifteen percent (15%) of thermal power generation plants in the U.S. that use coal, other fossil fuels, a combined cycle, and nuclear plants. The main disadvantages of cooling ponds are the large physical areas required for implementation and the poor quality of water contained within the pond.

The requirement of a large area for cooling pond implementation is based on the low temperatures to be maintained—generally below 22° C. This is because once the water temperature begins to rise, the pond water is more prone to the growth and proliferation of algae and other organisms that cause problems in the cooling system and the pond itself. So to maintain low temperatures, cooling ponds have very large areas of up to 2,500 hectares. Considering that land use is increasingly scarce, this solution is becoming less viable.

Another limitation of cooling ponds is the poor quality of water in the pond. In some plants, the cooling water from the pond must be subjected to additional treatments such as filtration and removal of compounds that damage machinery. The poor quality is due to the proliferation of microorganisms, algae, and sediment particles. Water quality in these ponds makes them unattractive for use in recreational purposes, and they may pose health hazards to people who use the pond.

Also, since the water temperature in the cooling pond is not permitted to increase to 25-30° C. or more, the heated water cannot be used for other purposes, therefore wasting valuable thermal energy.

Casting Industries

Other industries, such as foundry and cast industries, may use a cooling water system. The foundry industry is of high importance, especially for mining where metals are melted to produce other products. In the casting process, gases are generated at extremely high temperatures, which must be cooled for later discharge or use. Currently, most foundry industries use water cooling systems, either by recycling or by once through cooling systems.

Based on the cooling needs of many industries and the drawbacks of existing cooling systems, there is a need for improved cooling systems which operate at a lower cost, avoid thermal pollution and associated thermal damage to marine ecosystems, use less water, allow for flexibility in geographic locations, and/or take advantage of the thermal energy generated by the cooling process (e.g. heat exchanger) for useful purposes.

PREVIOUS ART

U.S. Pat. No. 4,254,818 generally describes preventing corrosion in the cooling system of an industrial operation through the use of aqueous brine with a concentration of 20-35% by weight. The brine circulates in a closed circuit between a heat exchanger for the operation and a cooling pond to maintain the desired brine concentration, which must be between 20 and 35% by weight. The cooling method requires a metal or alloy cooling system resistant to corrosion by water and by aqueous salt solution, and also requires a cooling tank containing an aqueous salt solution with a concentration of 20 to 35% by weight, and a closed circuit between said tank and the cooling system through which the brine circulates. In order to keep the desired concentration of the brine, the method contemplates replenishment of water to replace losses and maintain the salt concentration. There is also the option of using an auxiliary vessel or tank for the precipitation of calcium carbonate and calcium sulfate from effluent water from the cooling of the industrial operation, and transferring the water without those salts to the cooling pond, with the option of recovering the salts.

U.S. Pat. No. 4,254,818 requires the use of water with a certain concentration of salt, in the range of 20-35% by weight, therefore restricting the type of water that can be used. Also, this patent does not disclose the use of oxidizing agents and flocculants or coagulants, nor does the patent disclose the removal of suspended solids, algae, bacteria, metals, and organic matter. In addition, this patent does not provide an economical filtration system. Instead, the patent discloses the use of auxiliary tanks for the purpose of precipitating calcium carbonate and calcium sulfate, resulting in higher installation and maintenance costs.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter. The present invention can be employed in diverse industries and cooling systems. Although the present application refers to specific environments in which the principles of the present invention may be employed, such environments are representative and are not limiting.

Methods and systems in accordance with the principles of the present invention provide an industrial process with high quality cooling water, often comparable to the water quality of swimming pools, at a very low cost. In some embodiments, a coordinated cooling method and system comprising a large container to store water used to feed an industrial process are described, wherein the water is initially conditioned and maintained at a high quality, and is then recycled to achieve a sustainable cooling system over time. Additionally, the water heated by the industrial process optionally may be used for other purposes, such as for residential heating, producing hot water, thermal desalinization, and heating greenhouses, as well as various other industrial and residential purposes. In thermal desalination, the water to be desalinated needs to be heated before passing through the distillation processes. Therefore, the heated water from the container can be used for heating purposes in the thermal desalinization process.

Also, industries that use water or other fluids at high temperatures can employ this "pre-heated" water for producing water vapor or steam or for increasing the temperature of another fluid via heat exchange, thereby improving energy and cost efficiency.

In the case of cooling systems used in electricity generating plants, the present invention provides a coordinated cooling method which has several advantages over existing systems, such as being low cost, eco-friendly, and sustainable over time. The present invention uses less water than other systems, thereby allowing industries to locate in places before unimagined. Moreover, as the lagoon absorbs heat from the cooling process, a large temperate lagoon (e.g., a thermal energy reservoir) can be created that can be used for many industrial and recreational purposes. For example, if all thermal power plants used the present invention for cooling purposes, which allows for the use of the otherwise-wasted thermal energy, $CO_2$ emissions could be reduced by up to 50% in the world.

Unlike current once through cooling technology, the present invention provides a coordinated cooling method and system including a tempered lagoon operating in closed circuit, in an economical, sustainable and eco-friendly manner. The method and system avoid the adverse effects of thermal pollution associated with water discharge at high temperatures into the sea and its impact on marine organisms. Ultimately, the present invention will help prevent the high mortality of aquatic organisms that can occur due to the suction systems of prior art devices and passage through industrial cooling systems. In addition, it will allow locating plants in a diverse variety of geographical locations. In some instances, plant relocation may be possible to provide energy savings (e.g., since the plant can be located close to where energy is used or close to demand centers without having large distances between generation and consumption).

Still further, the present invention may increase the efficiency of heat exchangers though the use of very high quality water (e.g., comparable to swimming pool water) at a low cost. For example, seawater on average has a transparency of 2 meters horizontally, while the water of the present invention has a horizontal transparency of up to 40 meters. Sea water also contains a large amount of bacteria, while the water of the present invention contains significantly reduced amounts of organic matter, preferably little to no organic matter, after treatment. Thus, water from the present invention will minimize biofouling and prevent the formation of undesirable build-up in the pipes that reduce heat transfer. The cooling water of the present invention is recycled with minimal replacement, with replacement of water in the present invention necessitated mainly by evaporation from the lagoon.

Finally, the present invention may allow use of the residual thermal energy discarded by the industrial process. For example, the elevated temperature of the water returning to the cooling lagoon may be used for other purposes, such as for residential heating, producing hot water, thermal desalinization, or other industrial and residential uses.

Compared to wet cooling towers, the present invention provides a coordinated cooling method applied to a system that replenishes about 20% less water compared to cooling towers and evaporates about 20% less water to the atmosphere (based on current estimates and ambient temperatures and humidity). Thus, the present invention is better for the environment and natural resources. The large lagoons described herein also bring benefits in terms of cost reduction, achieving savings estimated at up to 50% with respect to the construction and operation of wet cooling towers. In addition, the present invention creates a lagoon that can be used for recreation and as a tourist attraction. For example, very large, tempered lagoons can be created which may be used for recreation throughout the year. And, as noted above, residual heat in the lagoon can be used for other industrial and residential purposes. The lagoons with recreational or industrial purposes can be organized in different configurations in order to allow several artificial cooling lagoons at the same time. Such lagoons can be configured in series, in parallel, and by coupling one lagoon to another.

Also, the present invention provides a method and system with several advantages over cooling ponds. First of all, treated water herein may reach a temperature of as high as 30° C., or as high as 50° C., or more, and still maintain excellent quality, comparable to conventional swimming pool water. Thus, the exposed surface area of the lagoons disclosed herein can be at least 3 to 10 times smaller than the exposed surface area of traditional cooling ponds. Also, if the water is maintained at higher temperatures, e.g., 40° C., further area reductions can be achieved, thus making the lagoons disclosed herein even more beneficial. By reducing the necessary surface area of the container or artificial lagoon, industrial plants can be constructed and operated in areas that were not possible before. Furthermore, the quality of water provided by the present invention exceeds by far the current quality of many artificial lakes, with high clarity water at temperatures that can fall within a range from about 20° C. to about 50° C., or higher.

Generally, the present invention discloses methods and systems for providing water of high purity and clarity from a constructed artificial lagoon or other artificial large body of water (e.g., container). This water can be used as a heat transfer fluid for cooling various industrial processes. Embodiments of the present invention are directed to the use of large amounts of water for the cooling of industrial processes in an economical and sustainable manner. The container or artificial lagoon supplying the water can act as a heat sink, absorbing the waste heat from the industrial process through the transfer of heat to the circulating cooling water.

In an embodiment, a method for providing high microbiological quality cooling water to an industrial process comprises the following:
a. Collecting inlet water from a water source;
b. Storing the inlet water in a container, wherein the container has a bottom capable of being cleaned by a mobile suction means;
c. Within periods of 7 days:
 i. For a container water temperature up to and including 35° C., maintaining an ORP of the container water above 500 mV for a minimum period of 1 hour for each ° C. of the container water temperature, by adding a disinfectant agent to the container water;
 ii. For a container water temperature greater than 35° C. and less than 70° C., maintaining an ORP of the container water above 500 mV for a minimum period of hours by adding a disinfectant agent to the container water, wherein the minimum period of hours is calculated by the following equation:

[35 hours]−[Temperature of the water in ° C.−35]
=minimum period of hours; or iii. For a container water temperature of 70° C. or more, maintaining an ORP of the container water above 500 mV for a minimum period of 1 hour, by adding a disinfectant agent to the container water;
d. Activating the following processes through a coordination means:
 i. Applying an oxidizing agent to the container water to prevent the iron and manganese concentrations of the container water from exceeding 1.5 ppm;
 ii. Applying a coagulant and/or flocculant to the container water to prevent the turbidity of the container water from exceeding 7 NTU;
 iii. Suctioning the container water with a mobile suction means to prevent a thickness of settled material from exceeding an average 100 mm;
 iv. Filtering the container water suctioned by the mobile suction means; and
 v. Returning the filtered water to the container; and
e. Supplying high microbiological quality cooling water from the container to an industrial process at a flow rate such that a difference in temperature between cooling water entering the industrial process and cooling water exiting the industrial process is at least 3° C.

In an embodiment, a system of the present invention for supplying cooling water to an industrial process comprises the following:
 a container for storing cooling water, the container comprising a bottom for receiving settled particles;
 a feeding line of inlet water to the container;
 a coordination means for timely activating processes necessary to adjust parameters of the cooling water within predetermined limits;
 a chemical application means activated by the coordination means;
 a mobile suction means for moving along the bottom of the container and suctioning cooling water containing settled particles;
 a propelling means for moving the mobile suction means along the bottom of the container;
 a filtration means for filtering the cooling water containing settled particles;
 a collecting line coupled between the mobile suction means and the filtration means;
 a return line from the filtration means to the container;
 a heat exchanger inlet line from the container to the industrial process; and
 a return water line from the industrial process to the container.

In the system, the bottom of the container generally comprises membranes, geo-membranes, geotextile membranes, plastic liners, concrete, coated concrete, or combinations thereof. The coordination means is capable of receiving information, processing that information, and activating other processes, such as the chemical application means, mobile suction means, and the filtration means. The chemical application means generally comprises injectors, sprinklers, manual application, dispensers by weight, pipes, or combinations thereof. The propelling means drives the mobile suction means and typically comprises a rail system, a cable system, a self-propelled system, a manually propelled system, a robotic system, a system guided from a distance, a boat with an engine, a floating device with an engine, or a combination thereof. The filtration means often comprises cartridge filters, sand filters, micro-filters, ultra-filters, nano-filters, or a combination thereof, and is generally connected to the mobile suction means by a collecting line comprising a flexible hose, a rigid hose, a pipe, or a combination thereof.

The present invention addresses diverse environmental problems arising from industrial cooling processes, including thermal pollution and the negative impact on the environment caused by such thermal pollution. The inventor of the novel technology disclosed herein, Mr. Fernando Fischmann, has developed many new advances in water treatment technology that are rapidly being adopted throughout the world. In a short period of time, the inventor's technologies related to recreational crystalline lagoons have been incorporated into more than 180 projects throughout the world. The inventor and his advancements in water treatment technology have been the subject of more than 2,000 articles, as can be seen at http://press.crystal-lagoons.com/. The inventor has also received important international awards for innovation and entrepreneurship related to these advances in water treatment technology and has been the subject of interviews by major media outlets including CNN, BBC, FUJI, and Bloomberg's Businessweek.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURES

The accompanying drawings, which are incorporated in and constitute a part of this disclosure, illustrate various embodiments of the present invention. In the drawings.

DETAILED DESCRIPTION OF THE INVENTION

Figure 1:
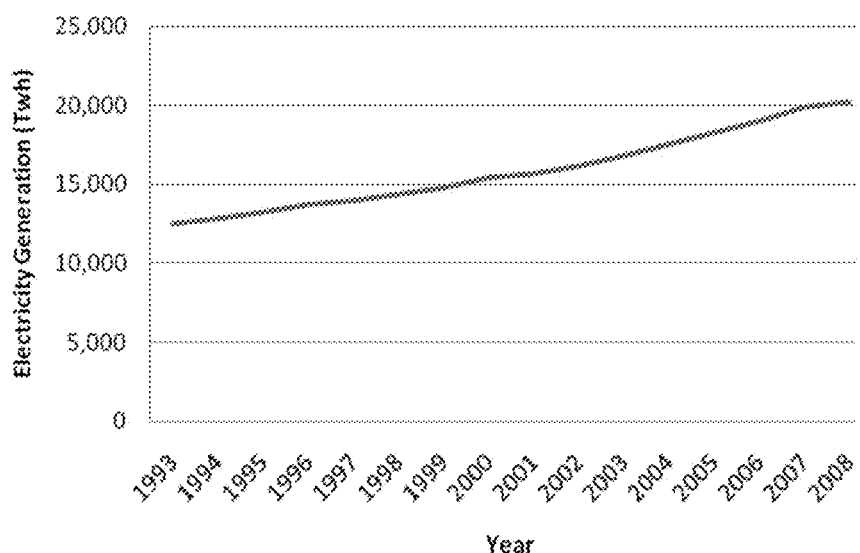
FIG. 1 is a graph illustrating the power generation increase in the world, in TWh, from 1993 to 2008.

The following detailed description refers to the accompanying drawings. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention. While systems and methods are described in terms of "comprising" various apparatus or steps, the systems and methods can also "consist essentially of" or "consist of" the various apparatus or steps, unless stated otherwise. Additionally, the terms "a," "an," and "the" are intended to include plural alternatives, e.g., at least one, unless stated otherwise. For instance, the disclosure of "a disinfectant agent," "an inlet line," "a mobile suction means," etc., is meant to encompass one, or more than one, disinfectant agent, inlet line, mobile suction means, etc., unless otherwise specified.

DEFINITIONS

In the light of the present disclosure, the following terms or phrases should be understood with the meanings described below.

The terms "container" or "containing means" or "water containing structure" are used generically herein to describe any artificial large body of water, including artificial lagoons, artificial lakes, artificial ponds, pools, and the like.

The term "coordination means" is used generically herein to describe an automated system that is able to receive information, process it, and make a decision according to it. In one embodiment of the invention, this could be done by a person, while in another embodiment this could be done with a computer connected to sensors.

The term "chemical application means" is used generically herein to describe any system that can add or apply chemicals, e.g., to the water in the container or lagoon.

The term "mobile suction means" is used generically herein to describe any suctioning device that is able to travel across the bottom surface of the container and suction any settled material or particles.

The term "propelling means" is used generically herein to describe any propelling device that provides movement, either by pushing or pulling another device.

The term "filtration means" is used generically herein to describe any filtration system, inclusive of systems comprising filters, strainers, and/or separators, and the like.

As used herein, the general types of water and their respective Total Dissolved Solids (TDS) concentration (in mg/L) are Fresh, with TDS≤1,500; Brackish, with 1,500<TDS≤10,000; and Seawater, with TDS>10,000.

As used herein, the term "high microbiological water quality" comprises a preferred aerobic bacteria count of less than 200 colony forming units "CFU"/ml, more preferably of less than 100 CFU/ml, and most preferably of less than 50 CFU/ml.

As used herein, the term "high clarity" comprises a preferred turbidity level of less than 12 Nephelometer Turbidity Units "NTU", more preferably of less than 10 NTU, and most preferably of less than 7 NTU.

As used herein, the term "small fraction" corresponding to the filtered water volume comprises a flow of up to 200 times less than the flow filtered in traditionally configured swimming pool water filtration systems.

As used herein, the term "traditional swimming pool water filtration system" or "conventional swimming pool water filtration system" or "conventional swimming pool filtration system" comprises a filtration system that filters the entire water volume that has to be treated, from 1 to 6 times per day, typically with a centralized filtration unit.

MODES FOR CARRYING OUT THE INVENTION

As discussed above, industrial cooling systems typically require large volumes of water of high quality and at low costs to feed heat exchangers for the condensing or cooling processes in many industries. In general, water is used in heat exchangers, as it has a heat capacity about 4 times greater than air, allowing greater efficiencies of heat transfer. In the heat exchange process, cooling water enters the exchanger at an initial temperature, absorbs heat increasing the temperature of the cooling water, for example, at least 3° C., or between 3° C. and 20° C., or about 10° C. Then, the cooling water at a higher temperature leaves the heat exchanger and is discharged, recycled back to the lagoon, or employed in some other downstream process. For instance, the artificial lagoon can be used to decrease the temperature of the water that exits the industrial cooling process, but before the water is discharged into a water source.

Furthermore, the cooling water quality is also very important, because depending on its quality, heat transfer in heat exchangers will have a greater or lesser efficiency, thus affecting the operation and maintenance costs of the plant. The quality of cooling water used today relies heavily on the water source from which the water has been extracted, either from the sea, rivers, lakes, etc.

The present invention relates to a method and system for providing an industrial process with high microbiological quality cooling water, comparable to the water quality of swimming pools, at a very low cost. By recirculating the cooling water, a sustainable process can be achieved, and at the same time, large volumes of water will be heated, thus creating reservoirs of thermal energy for other uses such as residential heating, producing hot water, thermal desalinization, heating greenhouses, and the like, as well as other industrial and residential uses.

Large volumes of treated water can be supplied from a large container or artificial lagoon. The surface area of the container or lagoon can be defined in some embodiments by the amount of energy that needs to be dissipated in the industrial process. Typically, the surface area can range from about 50 m$^2$ to about 30,000 m$^2$ per MW of cooling required by the industrial process. In some embodiments, the surface area can be in a range from about 50 m$^2$ to about 20,000 m$^2$, from about 50 m$^2$ to about 10,000 m$^2$, or from about 50 m$^2$ to about 5,000 m$^2$, per MW of cooling required by the industrial process. The container or lagoon can be used for recreational or industrial purposes and can be organized in different configurations in order to allow the use several artificial cooling lagoons or containers at the same time. Such lagoons or containers can be configured in series, in parallel, and by coupling one lagoon or container to another.

Consistent with embodiments disclosed herein, the methods and systems can treat large volumes of water at low cost. Generally, this involves purifying the water and eliminating suspended solids from the water without filtering the totality of the water volume, but only filtering a small fraction, corresponding to a volume up to 200 times smaller than for traditional swimming pool water filtration methods. Treated water produced by these methods and systems can be used as cooling water for industrial purposes, such as inlet water to an industrial heat exchange process.

Figure 2:
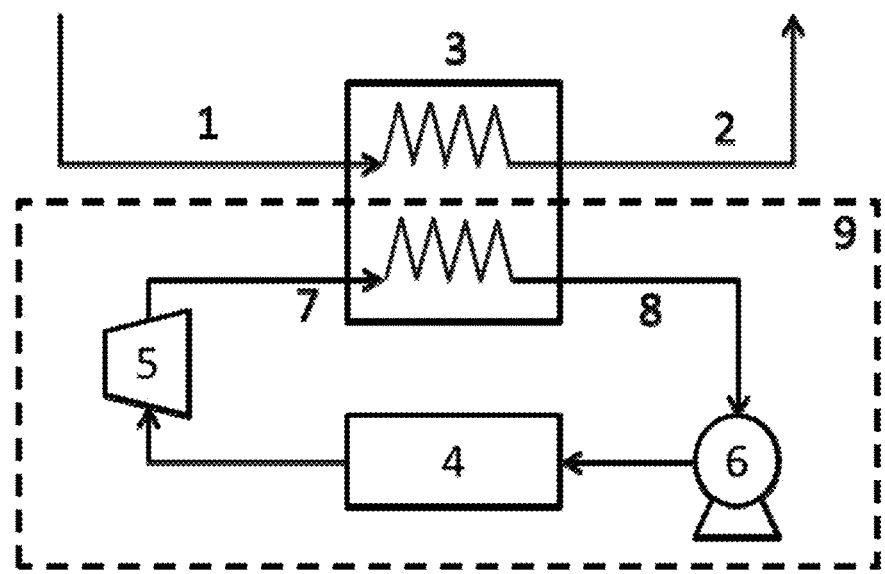
FIG. 2 is a process flow schematic diagram illustrating a heat exchange system of an embodiment of the present invention.

FIG. 2 illustrates an embodiment of the present invention directed to a heat exchange system. The system of FIG. 2 is shown for a simplified thermal power generation process (9). However, the general heat exchange concept of FIG. 2 can apply to any industrial process where cooling of a material or apparatus may be required. In FIG. 2, a vapor passes through one or more turbines (5), and then flows to a heat exchanger (3) where the vapor is condensed. Heated vapor (7) enters the heat exchanger, where heat is absorbed, and the material exits as a condensate (8). The condensate (8) can pass through a pumping system (6), where it is driven to a boiler (4) to be again transformed into vapor to pass through the turbines (5). In the heat exchanger (3), the fluid absorbing the heat can be inlet cooling water (1), which enters at a predetermined temperature, passes through the heat exchanger and absorbs heat from the vapor (7), and then exits (2) at a higher temperature.

Figure 3:
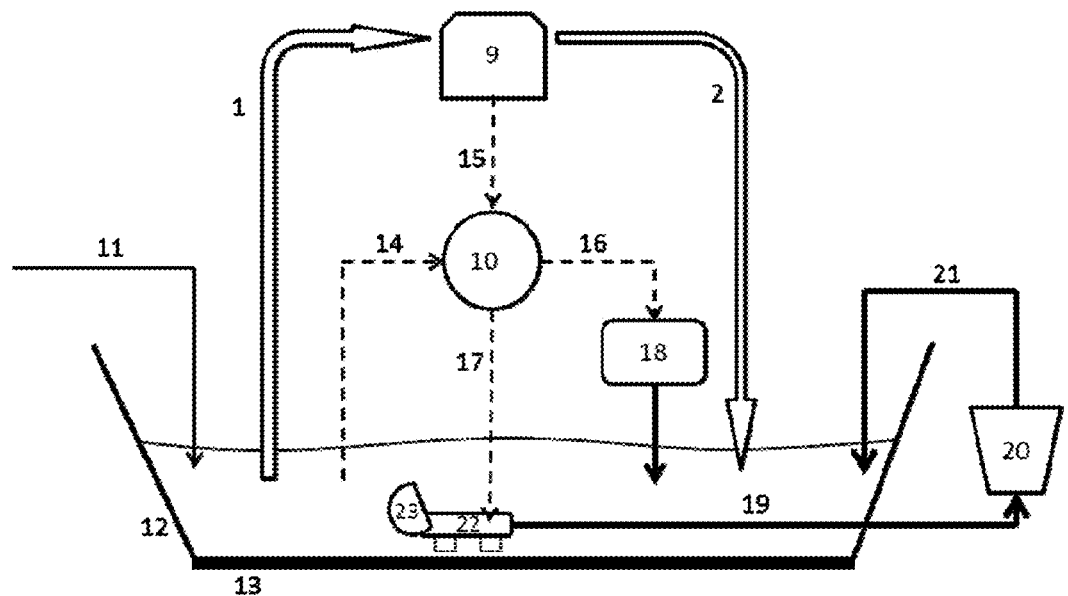
FIG. 3 is a process flow schematic diagram illustrating the use of water from a water containing structure, such as a lagoon, as a heat transfer fluid in an embodiment of the present invention.

A system of the invention generally includes a containing means, a coordination means, a chemical application means, a mobile suction means, and a filtration means. FIG. 3 illustrates an embodiment of a system of the invention, where water from a container or artificial lagoon is used as a heat transfer fluid in an industrial process. This system can comprise an inlet water line (11) to a container or artificial lagoon (12). The size of the container or artificial lagoon is not particularly limited, however, in many embodiments, the container or lagoon can have a volume of at least 10,000 m$^3$, or alternatively, at least 50,000 m$^3$. It is contemplated that the container or lagoon can have a volume of 1 million m$^3$, 50 million m$^3$, 500 million m$^3$, or more. The container or artificial lagoon (12) can have a bottom (13) which can receive settled material, such as bacteria, algae, suspended solids, metals, and other particles that settle from the water. There is also a controlling device or means (10) which monitors and controls the processes in order to adjust water quality parameters (14) within their respective limits. Such processes can include activation (16) of a chemical application means (18) and the activation (17) of a mobile suction means (22). The mobile suction means (22) moves along the bottom of the lagoon, suctioning water containing settled particles produced by any of the processes disclosed herein that may affect water quality. There is also a propelling means (23) that provides movement to the mobile suction means, such that the mobile suction means can traverse the bottom of the lagoon. The suctioned water can be sent to a filtration means (20) that filters the water containing the settled particles, thus eliminating the need to filter the totality of the water volume (e.g., only filtering a small fraction of the water in the lagoon over the same time period as a typical filtration system for a pool). The suctioned water can be sent to the filtration means by a collecting line (19) connected to the suction means. Also, there is a return line (21) from the filtration means back to the lagoon to return the filtered water. A cooling water inlet line (1) provides cooling water from the lagoon to an industrial process (9), such as a heat exchanger, and a return line (2) is provided for the water having a higher temperature coming from the industrial cooling process back to the lagoon. In some embodiments, this water coming from the industrial cooling process back to the lagoon does not add more than 10 ppm of iron to the water in the container or lagoon. The coordination means (10) can vary the flow of treated cooling water to the industrial process (9). The industrial process (9) can send information (15) to the coordination means (10) for establishing the predetermined limits of water quality.

The inlet water line (11) can comprise treated water, freshwater, brackish water, or seawater to be treated in accordance with a method and system of the invention. The method and system can include a coordination means (10) that allows the timely activation of the processes required to adjust the controlled parameters (e.g., water quality parameters) within limits specified by the operator or predetermined. In embodiments, the industrial process (9) can send information (15) to the coordination means (10) for establishing the predetermined limits of water quality. The present invention uses far less chemicals than traditional swimming pool water treatment systems, since chemicals are applied according to the systems' needs by the use of an algorithm that depends on water temperature, thus avoiding having to maintain permanent concentrations of chemicals in the water, which results in higher operational costs. Thus, there can be a considerable reduction in the amount of chemicals used, of up to 100 times as compared to conventional swimming pool water treatments, highly decreasing operating costs.

The water returned to the lagoon begins to slowly circulate and mix with the entire volume of water in the lagoon to achieve a lower temperature. The heat may be lost due to a heat exchange with the environment by conduction, convection, and/or evaporation. There is at least one extraction point (1) of the water from the lagoon to the industrial process and at least one return point (2) of water at higher temperatures from the industrial process to the lagoon, and they beneficially can be separated by a distance such that the temperature of water at the extraction point is not affected by the temperature of the water at the return point. Moreover, lagoon area/volume reductions can be realized if the temperature of the water at the return point and/or the temperature of the lagoon water are higher.

Information received by coordinating means can be obtained by visual inspection, empirical methods, algorithms based on experience, by electronic detectors, or combinations thereof.

Coordinating means can comprise one or more people, electronic devices, any means capable of receiving information, processing that information, and activating other processes, and this includes combinations thereof. One example of a controller means is computing device, such as a personal computer. Coordinating means can also include sensors utilized to receive information regarding the water quality parameters.

The chemical application means can be activated by the coordination means, and applies or dispenses chemicals into the water. Chemical application means can include, but are not limited to, injectors, sprinklers, manual application, dispensers by weight, pipes, and combinations thereof.

The bottom of the container or lagoon generally comprises or is covered with a non-porous material. The non-porous materials can be membranes, geo-membranes, geotextile membranes, plastic liners, concrete, coated concrete, or combinations thereof. In a preferred embodiment of the invention, the bottom of the container or artificial lagoon can comprise a plastic liner.

The mobile suction means moves along the bottom of the container or lagoon, suctioning water containing settled particles and materials produced by any of the processes disclosed herein. A propelling means can be coupled to the mobile suction means, allowing the mobile suction means to travel across the bottom of the container or lagoon. The propelling means drives the mobile suction means by using a system such as a rail system, a cable system, a self-propelled system, a manually propelled system, a robotic system, a system guided from a distance, a boat with an engine or a floating device with an engine, or combinations thereof. In a preferred embodiment of the invention, the propelling means comprises a boat with an engine.

The water suctioned by the mobile suction means can be sent to a filtration means. The filtration means receives the flow of water suctioned by the mobile suction means and filters the suctioned water containing the settled particles and materials, thus eliminating the need to filter the totality of the water volume (e.g., only filtering a small fraction). The filtration means can include, but is not limited to, cartridge filters, sand filters, micro-filters, ultra-filters, nano-filters, and combinations thereof. The suctioned water can be sent to the filtration means by a collecting line connected to the mobile suction means. The collecting line can be selected from flexible hoses, rigid hoses, pipes of any material, and combinations thereof. The system can include a line from the filtration means back to the container or lagoon for returning filtered water.

Figure 4:
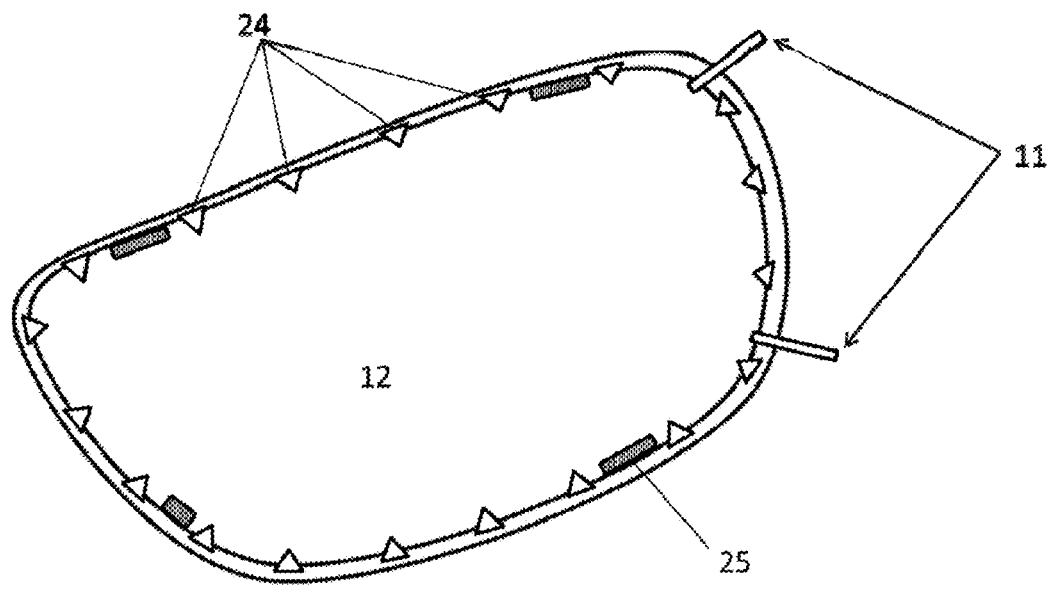
FIG. 4 shows a top view of a water containing structure, such as a lagoon, in an embodiment of the invention.

FIG. 4 shows a top view of a system of the invention. The container or artificial lagoon (12) can include an inlet feeding pipe system (11) for refilling the container or lagoon due to evaporation or other loss of water (e.g., purges or infiltration). The system can also include injectors (24) arranged along the perimeter of the container or artificial lagoon for applying or dispensing chemicals into the water. Skimmers (25) also can be used for removing surface oils and particles.

In an embodiment, a system for providing high microbiological quality cooling water to an industrial process comprises the following elements:

a container for storing cooling water, the container comprising a bottom for receiving settled particles;
a feeding line of inlet water to the container;
a coordination means for timely activating processes necessary to adjust parameters of the cooling water within predetermined limits;
a chemical application means activated by the coordination means;
a mobile suction means for moving along the bottom of the container and suctioning cooling water containing settled particles;
a propelling means for moving the mobile suction means along the bottom of the container;
a filtration means for filtering the cooling water containing settled particles;
a collecting line coupled between the mobile suction means and the filtration means;
a return line from the filtration means to the container;
a heat exchanger inlet line from the container to the industrial process; and
a return water line from the industrial process to the container.

This same system allows for the elimination of compounds or materials that are susceptible to settling by the addition of a chemical agent, since the mobile suction means can suction all the settled particles from the bottom of the container.

The method of the invention for treating water can be performed at low costs compared to traditional swimming pool water treatment systems, due to the fact that the present invention uses less chemicals and consumes less energy than traditional swimming pool water treatment systems. In one aspect, the present method uses far less chemicals because it applies an algorithm to maintain an ORP (oxidation reduction potential) of at least 500 mV for a certain period of time depending on the temperature of the water, thereby maintaining a high microbiological quality according to the water's real needs. The present method is carried out on a system as described herein that comprises a coordination means, which determines when to apply the needed chemicals in order to adjust the controlled parameters within their limits, based on the information received from the system. Since a coordination means is used, the chemicals are applied only when they are needed, avoiding the need to maintain a permanent concentration of the chemicals in the water. Thus, there is a considerable reduction in the amount of chemicals, of up to 100 times less than traditional swimming pool water treatment systems, resulting in decreased operating and maintaining costs.

In another embodiment, the method and system of the invention filters only a small fraction of the total volume of water within a particular time frame, as compared to conventional swimming pool water filtration systems that filter a much larger volume of water in the same time frame. In an embodiment, the small fraction of the total volume of water is up to 200 times smaller than the flow processed in traditional swimming pool water filtration systems, which filter the totality of the water volume. The filtering means in the method and system of the invention operates at shorter periods of time due to the orders received from the coordination means. Thus the filtering means has a very small capacity, resulting in up to 50 times lower capital costs and energy consumption compared to the centralized filtering unit required in the conventional swimming pool water filtration system.

A method for providing high microbiological quality cooling water to an industrial process, consistent with embodiments of this invention, can include the following steps:
a. Collecting inlet water from a water source;
b. Storing the inlet water in a container, wherein the container has a bottom capable of being cleaned by a mobile suction means;
c. Within periods of 7 days:
  i. For a container water temperature up to and including 35° C., maintaining an ORP of the container water above 500 mV for a minimum period of 1 hour for each ° C. of the container water temperature, by adding a disinfectant agent to the container water;
  ii. For a container water temperature greater than 35° C. and less than 70° C., maintaining an ORP of the container water above 500 mV for a minimum period of hours by adding a disinfectant agent to the container water, wherein the minimum period of hours is calculated by the following equation:

[35 hours]−[Temperature of the water in ° C.−35]
=minimum period of hours; or iii. For a container water temperature of 70° C. or more, maintaining an ORP of the container water above 500 mV for a minimum period of 1 hour, by adding a disinfectant agent to the container water;
d. Activating the following processes through a coordination means:
  i. Applying an oxidizing agent to the container water to prevent the iron and manganese concentrations of the container water from exceeding 1.5 ppm;
  ii. Applying a coagulant and/or flocculant to the container water to prevent the turbidity of the container water from exceeding 7 NTU;
  iii. Suctioning the container water with a mobile suction means to prevent a thickness of settled material from exceeding an average 100 mm;
  iv. Filtering the container water suctioned by the mobile suction means; and
  v. Returning the filtered water to the container; and
e. Supplying high microbiological quality cooling water from the container to an industrial process at a flow rate such that a difference in temperature between cooling water entering the industrial process and cooling water exiting the industrial process is at least 3° C.

Water treated by the method of the invention can be provided by a natural water source, such as oceans, groundwater, lakes, rivers, treated water, or combinations thereof.

Disinfectant agents can be applied to the water by a chemical application means, in order to maintain an ORP level of at least 500 mV for a minimum period of time according to the temperature of the water, within periods of 7 days at a time. The disinfectant agents include, but are not limited to, ozone, biguanide products, algaecide and antibacterial agents such as copper products; iron salts; alcohols; chlorine and chlorine compounds; peroxides; phenolic compounds; iodophors; quaternary amines (polyquats) in general, such as benzalkonium chloride and S-Triazine; peracetic acid; halogen-based compounds; bromine based compounds, and combinations thereof.

If the water temperature is up to and including 35° C., an ORP level of at least 500 mV is maintained for a minimum period of 1 hour for each ° C. of water temperature. For example, if the water temperature is 25° C., an ORP level of at least 500 mV is maintained for a minimum period of 25 hours, which can be distributed over the 7 day period.

If the water temperature is greater than 35° C. and less than 70° C., an ORP level of at least 500 mV is maintained for a minimum period of hours which is calculated by the following equation:

[35 hours]−[Temperature of the water in ° C.−35]
=minimum period of hours.

For example, if the water temperature is 50° C., an ORP level of at least 500 mV is maintained for a minimum period of 20 hours ([35]-[50−35]), which can be distributed over the 7 day period.

Finally, if the water temperature is 70° C. or more, an ORP level of at least 500 mV is maintained for a minimum period of 1 hour over the 7 day period.

Oxidizing agents can be applied or dispersed into the water to maintain and/or prevent the iron and manganese concentrations from exceeding 1.5 ppm. Suitable oxidizing agents include, but are not limited to, permanganate salts; peroxides; ozone; sodium persulfate; potassium persulfate; oxidants produced by electrolytic methods; halogen based compounds; and combinations thereof. Generally, the oxidizing agents are applied to and/or dispersed in the water by a chemical application means.

Antiscalant agents can be applied to or dispersed into the water to reduce or prevent scaling, for example, of a heat exchanger of the industrial process. Non-limiting examples of antiscalant agents include, but are not limited to, phosphonate-based compounds, such as phosphonic acid, PBTC (phosphobutan-tricarboxylic acid), chromates, zinc polyphosphates, nitrites, silicates, organic substances, caustic soda, malic acid-based polymers, sodium polyacrylate, ethylene diamine tetracetic acid sodium salts, corrosion inhibitors such as benzotriazole, and combinations thereof.

A flocculant or coagulant agent can be applied or dispersed into the water to aggregate, agglomerate, coalesce, and/or coagulate suspected particles in the water, which then settle to the bottom of the containing means. Generally, flocculant or coagulant agents are applied or dispersed into the water by a chemical application means. Suitable flocculant or coagulant agents include, but are not limited to, polymers such as cationic polymers and anionic polymers; aluminum salts, such as aluminum chlorhydrate, alum, and aluminum sulfate; quats and polyquats; calcium oxide; calcium hydroxide; ferrous sulphate; ferric chloride; polyacrylamide; sodium aluminate; sodium silicate; natural products, such as chitosan, gelatin, guar gum, alginates, moring a seeds; starch derivatives; and combinations thereof. The fraction of water in which the floccules collect or settle is generally the layer of water along the bottom of the container. The floccules form sediment at the bottom of the container that can then be removed by the mobile suction means without requiring that all of the water in the containing means be filtered, e.g., only a small fraction is filtered.

The chemical application means and mobile suction means in the method and system of the invention are timely activated by coordination means, in order to adjust the controlled parameters within their respective limits. The chemical application means and mobile suction means are activated according to the system's needs, resulting in the application of far less chemicals compared to conventional swimming pool water treatment systems, and the filtering of a small fraction of the total volume of water, up to 200 times smaller compared to conventional swimming pool water filtration systems that filter the totality of the water volume within the same time frame. In some embodiments contemplated herein, the "small fraction" of water being filtered can be less than about 30%, less than about 25%, less than about 20%, less than about 15%, less than about 10%, less than about, 9%, less than about 8%, less than about 7%, less than about 6%, less than about 5%, less than about 4%, less than about 3%, less than about 2%, less than about 1%, less than about 0.9%, less than about 0.8%, less than about 0.7%, less than about 0.6%, or less than about 0.5%, per day of the total volume of water.

In the method and system disclosed herein, the coordination means can receive information regarding the water quality parameters and their respective limits. The information received by the coordination means can be obtained by empirical methods. The coordination means is also capable of receiving information, processing that information, and activating the required processes according to that information, including combinations thereof. One example of a coordination means is a computing device, such as a personal computer, connected to sensors which measures the parameters and activates the processes according to such information.

Representative processes that may be activated by the coordination means include:

Timely activation of the chemical application means, providing information about the dosage and addition of the suitable chemicals to maintain the controlled water quality parameters within their respective limits.

Timely activation of the mobile suction means, which can simultaneously activate the filtration means for filtering the water suctioned by the mobile suction means, thus filtering only a small fraction of the container or artificial lagoon water, as compared to traditionally configured centralized swimming pool filtration systems.

The coordination means also provides information to the mobile suction means to activate the mobile suction means. The coordination means can simultaneously activate the filtration means in order to filter the flow suctioned by the mobile suction means, i.e., filtering only a small fraction of the entire volume of water. The mobile suction means is activated by the coordination means to prevent the thickness of settled material, generally, from exceeding 100 mm. The filtration means and mobile suction means operate only as needed to maintain the parameters of the water within their limits, for instance, only a few hours a day, as opposed to conventional filtration systems which operate substantially continuously. In further embodiments, the mobile suction means can prevent the thickness of the settled material from exceeding 50 mm, or 25 mm, or 15 mm. In some circumstances, the container or artificial lagoon can be used for recreational purposes in addition to being a source of cooling water for industrial processes.

In some embodiments, the mobile suction means can travel along the bottom of the artificial lagoon, thoroughly suctioning the water flow containing the settled particles, thereby allowing the bottom of the lagoon to be easily visible thru the water. Moreover, the bottom of the lagoon can be any color, including white, yellow, or light blue, often providing the water body with an attractive color. In an embodiment, horizontal visibility through the lagoon water can be at least 4 meters, at least 6 meters, at least 10 meters, or at least 15 meters, and in some cases up to 40 meters.

In addition to its use for cooling purposes, the water in the artificial lagoon may be of sufficient quality and purity to comply with governmental regulations for recreational water with direct contact and/or governmental regulations for swimming pool water quality. For instance, the water contained in the artificial lagoon can comply with the bacteriological requirements for recreational water with direct contact from the Environmental Protection Agency [EPA Criteria for Bathing (Full Body Contact) Recreational Waters, 1986].

Figure 5:
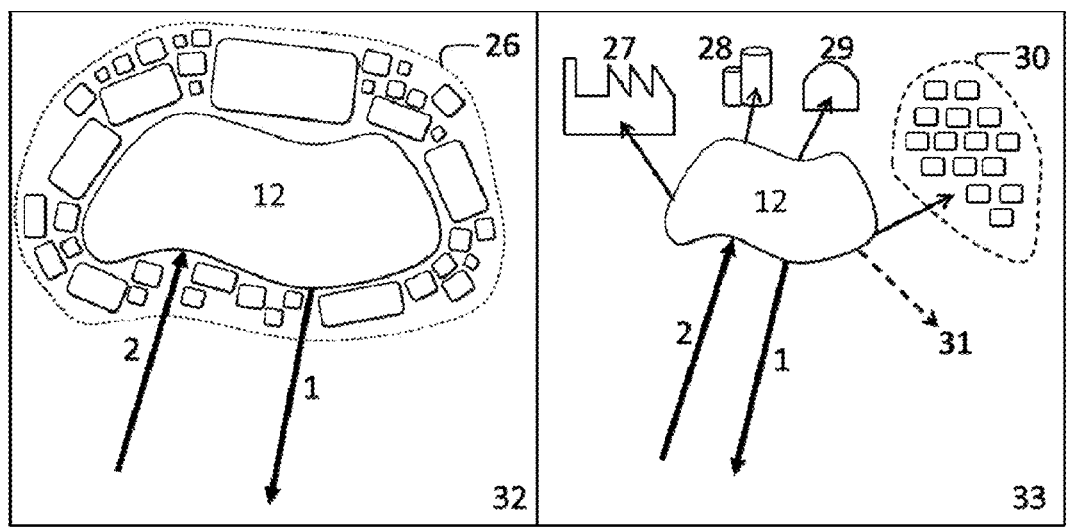
FIG. 5 is a schematic diagram illustrating possible recreational and industrial uses of a water containing structure, such as lagoon, in embodiments of the present invention.

FIG. 5 illustrates embodiments of various recreational and industrial uses of a container or artificial lagoon (12) disclosed herein. The container or artificial lagoon (12) comprises an inlet line (2) and outlet line (1) for water. In one embodiment (33), various uses of a lagoon containing heated water (a thermal energy reservoir) are illustrated: residential heating (30), supplying hot water for thermal desalinization purposes (28), for greenhouse heating (29), or preheating process fluids or supplying preheated water to diverse industrial processes (27), as well as other miscellaneous industrial and residential uses (31). In another embodiment (32), the use of a lagoon (12) containing heated water (a thermal energy reservoir) is illustrated for commercial/recreational purposes, such as surrounding the lagoon with real estate developments (26).

EXAMPLES

For the following examples, the terms "a/an/the" include plural alternatives (at least one). The disclosed information is illustrative, and other embodiments exist and are within the scope of the present invention.

Example 1

A method and system of the present invention was employed in the cooling process of an oil generator. A container having a volume of 200 m$^3$ and surface area of approximately 285 m$^2$ was filled with seawater having a TDS concentration of about 35,000 ppm. The temperature of the water in the container was 35° C. Based on this temperature, an ORP of at least 500 mV was maintained for a period of (35×1) 35 hours during the week. On Monday, to maintain the ORP for a period of 12 hours, sodium hypochlorite was added to the water in order to reach a concentration of 0.16 ppm in the water. Later in the week on Wednesday, the ORP was maintained for a period of 9 hours by maintaining the same sodium hypochlorite concentration. Finally, on Friday a concentration of 0.16 ppm of sodium hypochlorite in the water was maintained for the remaining (35-12-9) 14 hours to complete the 35 hours in the week. There was no need to perform an additional oxidation process to adjust the iron and manganese levels, since the sodium hypochlorite had the sufficient redox potential to oxidize the iron and magnesium. A flocculant was added before the turbidity of the water reached a value of 7 NTU, and Crystal Clear® was injected until a concentration of 0.09 ppm was achieved in the container.

Based on the information received from the system, the coordination means activated the suctioning means before the thickness of the settled material exceeded 100 mm. The settled material, a product of the coordinated method, was suctioned by a device that traveled the surface of the container and the collected flow was filtered through a sand filter at a rate of 5 L/sec. It was not necessary to filter the entire volume of water. The suction device extracted only a small fraction of the entire volume of water containing the sediments, and delivered this water to the sand filter. The filtered water was then returned back to the container from the sand filter via a return line.

The conditioned water was used to cool one Hyundai Diesel Engine, model D6CA. The type of engine is a 6 cylinder, vertical engine, cooled by water. The generator was a Stanford of 125 kVA. The heat exchanger of the Diesel Engine was fed with filtered water from the container. The temperature of feed water to the exchanger was 35° C., and the temperature of discharge water back to the container was of 39.3° C., thus, the cooling water temperature increased approximately 4.3° C. The recycling water flow of each generator was 3.45 L/sec. In this way, the generator was cooled and at the same time the residual heat was used to heat the water of the container, which is maintained at high temperatures because of this heat exchange. Cooled thermal power was approximately 62 kW, resulting in a surface/MW rate of:

$$\frac{285 \ m^2}{0.062 \ MW} = 4,596 \frac{m^2}{MW}$$

The heated water was used in a tempered swimming pool for recreational purposes, therefore representing high energy savings compared to heating the water with traditional methods (such as boilers).

Example 2

The method and system of the present invention can be used to treat and maintain water for cooling a 420 MW thermal power station. An artificial lagoon can be built, with a surface area of 360,000 m², a volume of approximately 540,000 m³, and a water temperature of around 45° C. The following table shows the estimated surface areas (hectare=ha) that may be required for cooling a 420 MW power plant, based on the lagoon water temperature:

TABLE 1

| | T° Lagoon (° C.) | | | | | | | | | | | | | | | |
|---|---|---|---|---|---|---|---|---|---|---|---|---|---|---|---|---|
| | 25 | 28 | 29 | 30 | 32 | 33 | 35 | 36 | 38 | 39 | 41 | 43 | 45 | 47 | 49 | 50 |
| Area (ha) | 555 | 229 | 190 | 161 | 122 | 107 | 86 | 77 | 64 | 59 | 49 | 42 | 36 | 31 | 27 | 25 |

The lagoon can be fed by an inlet water line with water from the sea having a total dissolved solid's concentration of approximately 35,000 ppm, until the lagoon in full.

The temperature of the water is 45° C., which is more than 35° C., so an ORP of at least 500 mV is maintained for a total of 25 hours (35-[45-35]=25) distributed within a 7-day period. For example, on a Tuesday, sodium bromide can be added in order to maintain a concentration of 0.134 ppm in the water for 12 hours, and then on Friday of the same week, the chemical addition can be repeated in the same manner for 13 hours, thus completing the total of 25 hours for the 7-day period.

The coordination means, which can be a person, receives information regarding the controlled parameters of the method and system (e.g., various water quality parameters). It may not be necessary to add an oxidizing agent to the water, since sodium bromide generally has sufficient redox potential to oxidize iron and manganese.

For the flocculating step, Crystal Clear® can be injected before the turbidity reaches a value of 7 NTU, to obtain a concentration of 0.08 ppm in the water. The flocculant addition can be repeated every 48 hours.

After settling of bacteria, metals, algae and other solids, and before the thickness of the settled material layer reaches 15 mm, the coordination means can activate the mobile suction means, which can comprise 9 suctioning devices that move along the bottom of the lagoon, suctioning the water containing any settled particles. Each of the 9 suctioning devices can be coupled to a propelling means, in this case, a boat with an engine. The water flow containing the settled particles, for each suctioning device, can be pumped by means of a 5.5 kW pump to a filtering means through flexible hoses.

The suctioned flow for each suction device can be filtered by sand filters at a rate of 21 L/sec. Thus, there is no need to filter the whole volume of water—instead only filtering the water fraction that contains the settled particles suctioned by the suction devices, which is up to 200 times less than volume of water filtered by conventional swimming pool filtration systems. The filtered water can be returned back to the lagoon by means of a return line, which can be a flexible hose.

The treated water can be used as cooling water for a 420 MW thermal power station. The power (or heat) to be dissipated, the water flow rate, and the temperature rise of the water are correlated by the equation:

$$[\dot{Q}=\dot{m} \cdot c_p \cdot \Delta T,] Q=m \cdot c_p \cdot \Delta T$$

where $c_p$ is the specific heat of water at constant pressure, approximately:

$$[4.000 \ kj/kg \cdot K.] 4.000 \ kj/kg \cdot K.$$

Hence, for a 420 MW plant, the cooling water flow rate can be 54,000 m³/h with an increase in cooling water temperature of about 7° C. The surface area of the lagoon is 36 hectares, which converts to 0.086 hectares for each MW of cooling required.

The cooling water portion of the heat exchanger of the thermal power plant can be fed with water from the lagoon, through various means. The water temperature of the lagoon, and thus the inlet cooling water temperature to the heat exchanger, is around 45° C. After exiting the heat exchanger, the water can be returned back to the lagoon at a temperature of around 52° C. Thus, the water used in the industrial cooling process increases in temperature by about 7° C.

The water returned back to the lagoon, which is at a higher temperature, begins to flow slowly throughout the lagoon, mixing with the entire water volume of the lagoon, thus reducing the temperature of the returned water. The lagoon's temperature stays at about 45° C. on average, and water can be extracted from the lagoon for use in the industrial cooling process again, or on a continuous basis. The treated water in the lagoon can have the following parameters:

| Parameter | Unit | Treated Water | Drinking Water Norm-NCh409 |
|---|---|---|---|
| pH | — | 7.96 | 6.5 < pH < 8 |
| Odor | — | Odorless | Odorless |
| Turbidity | NTU | 0.2 | <2 |
| TDS | mg/L | 35,000* | 1,500 |
| Iron | mg/L | 0.1 | <0.3 |
| Manganese | mg/L | <0.01 | <0.1 |

-continued

| Parameter | Unit | Treated Water | Drinking Water Norm-NCh409 |
|---|---|---|---|
| Organic Matter | | | |
| Tetrachloroethene | μg/l | Not detected | 40 |
| Benzene | μg/l | Not detected | 10 |
| Toluene | μg/l | 0.01 | 700 |
| Xylenes | μg/l | Not detected | 500 |
| Pesticides | | | |
| D.D.T + D.D.D + D.D.E | | Not detected | 2 |
| 2.4 D | μg/l | Not detected | 30 |
| Lindane | μg/l | Not detected | 2 |
| Methoxychlor | μg/l | Not detected | 20 |
| Pentachlorophenol | μg/l | Not detected | 9 |
| Secondary Products of Disinfection | | | |
| Monochloramines | mg/l | <0.1 | 3 |
| Dibromochloromethane | mg/l | <0.005 | 0.1 |
| Dichloromethane | mg/l | Not detected | 0.06 |
| Tribromomethane | mg/l | 0.037 | 0.1 |
| Trichloromethane | mg/l | Not detected | 0.2 |
| Trihalomethanes | mg/l | <1 | 1 |
| Microbiological Analysis | | | |
| Total Coliforms | NMP/100 ml | <2 | <2 |
| *Escherichia coli* | NMP/100 ml | Absence | Absence |
| Aerobic Bacteria | Colonies/100 ml | 2 | ≤200[L] |

*Typical value of sea water before treatment in the lagoon
[L](Not specified in NCh409) Swimming pool norm-NCh209

As can be seen from this example, the use of the present invention has several advantages over existing cooling systems, which include: avoiding the generation of a harmful environmental impact on the marine ecosystem due to either thermal pollution and the suction of aquatic organisms into the industrial process, since the illustrated system is a recirculating water system in a closed circuit that does not interact with the ocean or natural water sources; low installation and operating costs compared to cooling towers and other known cooling systems; the possibility to locate the industrial plant in places unimaginable before, due to the low consumption of water from a water source—it is not necessary that the industrial plant be located near the sea or other natural sources of water; and at the same time, creating a large reservoir of energy for many other uses, such as for residential heating, producing hot water, and thermal desalinization, as well as other industrial, residential, and/or recreational uses.

Due to the low cost filtering means, where only a small fraction of the total volume of water is filtered (up to 200 times less than conventional swimming pool filtration systems), and the reduced usage of chemicals (up to 100 times less than those used in conventional systems), it is possible to maintain these large bodies of high clarity water. Using conventional technologies of filtration and disinfection would not be economically feasible for containers or lagoons of these large dimensions.

A conventional pool filtration system often filters the entire volume of water up to 6 times a day, imposing high costs of installation and maintenance, in addition to consuming a large amount of energy in the process. For the 36 hectare lagoon illustrated above, in order to filter the entire volume of water up to 6 times a day, a building/area of about 1 hectare may be required to install the entire filtration system, making such construction and maintenance unviable, and thus, any associated cooling system would not be economically feasible. Furthermore, in terms of cost, for the example presented above, a comparison is provided below:

| | Description | Installation costs | Monthly operating costs |
|---|---|---|---|
| Traditional Filtration A building of about 1 hectare to filter the entire water volume up to 6 times a day | 540 pumps 270 filters + sand 1 hectare of surface Operators Maintenance 270 valve batteries Energy consumption | US $12,089,916 | US $536,607 |
| 9 Suctioning Means Each one moves along the bottom of the lagoon, driven by engine propelled boats | Boat Motor Suctioning Device Suctioning pump Hoses, accessories Fuel Flocculant Operator Maintenance | US $226,494 | US $20,178 |

By using 9 suctioning devices and the system described herein, the installation costs are reduced by about 50 times and the operating costs reduce by about 25 times. Hence, the containers or lagoons represent viable and cost effective options for providing cooling water to power plants and other industrial processes.

While certain embodiments of the invention have been described, other embodiments may exist. Further, any disclosed method steps or stages may be modified in any manner, including by reordering steps and/or inserting or deleting steps, without departing from the invention. While the specification includes a detailed description and associated drawings, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

The invention claimed is:
1. A system for providing high microbiological quality cooling water, wherein the system is in fluid communication with an industrial process in need of cooling, and wherein the system provides cooling water to the industrial process, the system comprising:
   a manufactured container for holding a water body comprising fresh water, brackish water, or sea water for cooling the industrial process, wherein the container is an artificial lake, lagoon, or pond having a bottom comprising a liner capable of being cleaned by a mobile suction device, the water body comprises a volume of at least 10,000 m³ and a surface area from about 50 to about 30,000 m² per MW of cooling required by the industrial process, and the surface area of the water body is defined by the container;
   a feeding line of inlet water to the container;
   coordination means for maintaining the cooling water in the container within predetermined water quality parameters;

chemical application means for applying a disinfectant agent, oxidizing agent, coagulant, or flocculant to the cooling water in the container;

a mobile suction device capable of moving along the bottom of the container and suctioning a portion of the cooling water from the bottom of the container containing the settled particles;

propelling means for moving the mobile suction device along the bottom of the container;

filtration means for filtering the portion of cooling water containing settled particles suctioned by the mobile suction device;

a collecting line coupled between the mobile suction device and the filtration means;

a return line from the filtration means to the container;

a heat exchanger inlet line in fluid communication with the container and the industrial process, capable of feeding a heat exchanger of the industrial process with cooling water from the container; and a return heat exchanger water line in fluid communication with the industrial process and the container, capable of discharging the heated cooling water from the industrial process into the container;

wherein the coordination means receives information obtained by visual inspection, an empirical method, an algorithm, or a detector regarding water quality parameters and controls activation of the chemical application means, mobile suction device, and filtration means to adjust said water quality parameters within their limits.

2. The system of claim 1, wherein the liner comprises a membrane, geomembrane, geotextile membrane, plastic liner, concrete, coated concrete, or a combination thereof.

3. The system of claim 1, wherein the chemical application means comprises an injector, a sprinkler, manual application, a weight dispenser, or combinations thereof.

4. The system of claim 1, wherein the propelling means comprises a rail system, a cable system, a self-propelled system, a manually propelled system, a robotic system, a system guided from a distance, a boat with an engine, a floating device with an engine, or a combination thereof.

5. The system of claim 1, wherein the filtration means comprises a cartridge filter, a sand filter, a micro-filter, an ultra-filter, a nano-filter, or a combination thereof.

6. The system of claim 1, wherein the collecting line comprises a flexible hose, a rigid hose, a pipe comprising any material, or a combination thereof.

7. The system of claim 1, wherein the coordination means activates the chemical application means to apply an oxidizing agent to the cooling water in the container to prevent iron and manganese concentrations of the cooling water from exceeding 1.5 ppm.

8. The system of claim 1, wherein the coordination means activates the chemical application means to apply a coagulant and/or flocculant to the cooling water in the container to prevent the turbidity of the cooling water from exceeding 7 NTU.

9. The system of claim 1, wherein the coordination means activates the mobile suction device to prevent a thickness of settled material at the bottom of the container from exceeding an average 100 mm.

10. The system of claim 1, wherein the coordination means activates the chemical application means to periodically apply disinfecting agents to the cooling water in the container during 7-day intervals to establish an oxidation reduction potential (ORP) of at least 500 mV for a total treatment time during each 7-day interval that is dependent on the temperature of the cooling water being treated, wherein:

i. for cooling water having a temperature up to and including 35° C., the total treatment time comprises a minimum period of 1 hour for each ° C. of the cooling water temperature;

ii. for cooling water having a temperature greater than 35° C. and less than 70° C., the total treatment time comprises a minimum period of hours calculated by the following equation:

$$[35 \text{ hours}] - [\text{Temperature of the water in } °C. -35 \times 1 \text{ hour}/°C.] = \text{minimum period of hours; or}$$

iii. for water having a temperature of 70° C. or more, said total treatment time comprises a minimum period of 1 hour.

11. The system of claim 1, wherein the cooling water is recirculated between the container industrial process by the heat exchanger inlet line and the return water line.

12. The system of claim 11, wherein the system is a closed circuit.

13. The system of claim 1, wherein the disinfectant agent comprises ozone, a biguanide compound, a bromine-based compound, a halogen-based compound, or a combination thereof.

14. The system of claim 1, wherein the oxidizing agent comprises a halogen-based compound, a permanganate salt, a peroxide, ozone, sodium persulfate, potassium persulfate, an oxidant produced by an electrolytic method, or a combination thereof.

15. The system of claim 1, wherein the coagulant and/or flocculant comprises a cationic polymer, an anionic polymers, an aluminum salt, aluminum chlorhydrate, alum, aluminum sulfate, a quat and/or polyquat, calcium oxide, calcium hydroxide, ferrous sulphate, ferric chloride, a polyacrylamide, sodium aluminate, sodium silicate, chitosan, gelatin, guar gum, an alginate, a moringa seed, a starch derivative, or a combination thereof.

16. The system of claim 1, wherein the manufactured container is an artificial lake.

17. The system of claim 1, wherein the manufactured container is an artificial lagoon.

18. The system of claim 1, wherein the manufactured container is an artificial pond.

19. The system of claim 1, wherein the system is capable of maintaining, in the cooling water within the container, concentrations of iron and manganese at or below 1.5 ppm; turbidity at or below 7 NTU; thickness of settled material at the bottom of the container at or below 100 mm; and an oxidation reduction potential (ORP) of at least 500 mV for a total treatment time during every 7-day interval that is dependent on the temperature of the cooling water being treated, wherein:

i. for cooling water having a temperature up to and including 35° C., the total treatment time comprises a minimum period of 1 hour for each ° C. of the cooling water temperature;

ii. for cooling water having a temperature greater than 35° C. and less than 70° C., the total treatment time comprises a minimum period of hours calculated by the following equation:

$$[35 \text{ hours}] - [\text{Temperature of the water in } °C. -35 \times 1 \text{ hour}/°C.] = \text{minimum period of hours; or}$$

iii. for water having a temperature of 70° C. or more, said total treatment time comprises a minimum period of 1 hour.

20. The system of claim 1, wherein the mobile suction device is capable of suctioning a layer of settled particles having a thickness of about 100 mm.

21. A cooling water system for providing cooling water to an industrial process in need of cooling, wherein the system is in fluid communication with the industrial process and wherein the system provides cooling water to the industrial process, the system comprising:
- a manufactured container for holding a water body comprising fresh water, brackish water, or sea water for cooling the industrial process, wherein the container is an artificial lagoon, lake, or pond having a bottom comprising a non-porous liner, the water body comprises a volume of at least 10,000 m$^3$ and a surface area from about 50 to about 30,000 m$^2$ per MW of cooling required by the industrial process, and the surface area of the water body is defined by the container;
- a suction device capable of moving along the bottom of the container and suctioning a portion of the cooling water from the bottom of the container containing settled particles;
- a filtration system comprising a cartridge filter, sand filter, micro-filter, ultra-filter, nanofilter, or a combination thereof;
- a collecting line operatively connecting the self-propelled suction device to the filtration system, wherein the collecting line is constructed to lead suctioned water from the suction device to the filtration system;
- a first return line operatively connecting the filtration system to the container, wherein the first return line is constructed to lead filtered water from the filtration system to the container;
- a system for applying chemicals to the water, the system comprising a pipe, a dispenser, an injector, a sprinkler, or a combination thereof;
- an automated system comprising a computer and sensors configured to receive information obtained by visual inspection, an empirical method, an algorithm, or a detector regarding water quality parameters, process the information, and control activation of the self-propelled suction device, the filtration system, and the system for applying chemicals to adjust the water quality parameters within predetermined water quality limits;
- a feeding line operatively connecting the container to a heat exchanger of the industrial process, wherein the feeding line is constructed to provide cooling water from the container to the heat exchanger; and
- a second return line operatively connecting the heat exchanger of the industrial process to the container, wherein the second return line is constructed to direct spent cooling water from the heat exchanger to the container.

22. The system of claim 21, wherein the system is a closed circuit.

23. The system of claim 21, wherein the manufactured container is an artificial lake.

24. The system of claim 21, wherein the manufactured container is an artificial lagoon.

25. The system of claim 21, wherein the manufactured container is an artificial pond.

* * * * *